United States Patent [19]
O'Toole et al.

[11] Patent Number: 5,889,856
[45] Date of Patent: Mar. 30, 1999

[54] ADSL INTEGRATED LINE CARD WITH DIGITAL SPLITTER AND POTS CODEC WITHOUT BULKY ANALOG SPLITTER

[75] Inventors: Anthony J. P. O'Toole, San Jose; Shahin Hedayat, San Ramon; Surendra Babu Mandava, San Jose, all of Calif.

[73] Assignee: Centillium Technology Corp., Fremont, Calif.

[21] Appl. No.: 862,127

[22] Filed: May 22, 1997

[51] Int. Cl.$^6$ .............................. H04M 9/00; H04J 3/12
[52] U.S. Cl. ..................... 379/399; 379/93.09; 370/480
[58] Field of Search ............................... 379/399, 93.09, 379/398; 370/480, 484; 341/141

[56] References Cited

U.S. PATENT DOCUMENTS

| | | | |
|---|---|---|---|
| 5,255,317 | 10/1993 | Aral et al. | 379/399 |
| 5,365,577 | 11/1994 | Davis et al. | 379/96 |
| 5,408,260 | 4/1995 | Arnon | 348/6 |
| 5,410,343 | 4/1995 | Coddington et al. | 348/7 |
| 5,442,630 | 8/1995 | Gagliarki et al. | 370/85.13 |
| 5,448,635 | 9/1995 | Biehl et al. | 379/399 |
| 5,461,616 | 10/1995 | Suzuki | 370/79 |
| 5,483,530 | 1/1996 | Davis et al. | 370/79 |
| 5,509,009 | 4/1996 | Laycock et al. | 370/62 |
| 5,511,075 | 4/1996 | Bhasker | 370/85.13 |
| 5,519,731 | 5/1996 | Cioffi | 375/260 |
| 5,534,912 | 7/1996 | Kostreski | 348/6 |
| 5,563,943 | 10/1996 | Takebayashi et al. | 379/373 |
| 5,579,127 | 11/1996 | Kaneko | 358/434 |
| 5,587,735 | 12/1996 | Ishida et al. | 348/14 |
| 5,610,922 | 3/1997 | Balatoni | 370/468 |
| 5,815,505 | 9/1998 | Mills | 370/522 |

OTHER PUBLICATIONS

ADSL and VADSL Splitter Design and Telephony Performance, J. Cook and P. Sheppard, IEEE J. on Selected Areas in Comm., vol. 13, No. 9, DEC. 1995, pp. 1634–1642.

*Primary Examiner*—Forester W. Isen
*Assistant Examiner*—Jacques M. Saint-Surin
*Attorney, Agent, or Firm*—Stuart T. Auvinen

[57] ABSTRACT

An integrated line-card terminates an asymmetric digital-subscriber line (ADSL) copper-pair at a single point in a central office. The line card contains analog line circuitry such as a ring generator, off-hook detector, D.C. current feed, and a single analog-digital (A/D) converter. The phone line carries a composite signal of both the high-frequency ADSL data and the low-frequency voice or plain-old-telephone-service (POTS) signal. Instead of using an analog frequency-splitter with bulky, expensive inductor coils, a digital splitter is used. A digital-signal processor (DSP) can be used to perform the digital splitting of ADSL and POTS. The waveforms from the analog phone line are first converted to digital values by the A/D converter, and then a digital splitter separates the low-frequency POTS from the high-frequency ADSL. The ADSL data is formatted by the DSP for a data pathway to the Internet, while the POTS data is converted by the DSP to A-Law or C-Law for transmission over the telephone network's PCM highway. The DSP can perform all decoding, encoding, compression, and formatting needed by both ADSL and POTS. The quality of the phone line is improved by having a single termination point at the central office, rather than separate termination points for POTS and ADSL data from the phone line.

22 Claims, 8 Drawing Sheets

ADSL INTEGRATED LINE CARD WITH DIGITAL SPLITTER AND POTS CODEC WITHOUT BULKY ANALOG SPLITTER

BACKGROUND OF THE INVENTION

1. Field of the Invention

This invention relates to telephone systems, and more particularly to central-office equipment for Digital Subscriber Lines (DSL) that use frequency-division-multiplexing to share the line with Plain Old Telephone Service (POTS) equipment.

2. Description of the Related Art

The demand for telephone bandwidth continues to increase as more telephone customers send data traffic over phone lines. While it is feasible to run high-speed fiber-optic cable to some new customers, existing customers are connected to the phone system by slower coppers wires. The cost of replacing existing copper wires with higher-speed fiber-optic cable is prohibitive. Thus, higher-bandwidth technologies that use the existing copper-cable phone lines are desirable.

Integrated Services Digital Network (ISDN) boosted data rates over existing copper phone lines to 128 kbps. Special termination and conditioning of the existing copper phone lines is required for ISDN. ISDN's future is in doubt now that newer analog modems are reaching 56 kbps without expensive conditioning of the phone lines. Digital-Subscriber Lines (DSL) are now becoming available. DSL provides bandwidth up to 8 Mbps downstream, or up to 2 Mbps symmetric. DSL approaches the bandwidth of T1 lines, about 1.5 Mbps. Several variations of DSL technology are being explored, such as HDSL, IDSL, SDSL, RADSL and ADSL. ADSL (asymmetric DSL) is particularly attractive for consumer Internet applications where most of the data traffic is downloaded to the customer. Upstream bandwidth for uploading data can be reduced to increase downstream bandwidth since most Internet traffic is downstream traffic. See U.S. Pat. Nos. 5,461,616, 5,534,912, and 5,410,343 for descriptions of ADSL technology.

VOICE AND DATA CALLS ON ADSL—FIG. 1

Some DSLs such as ADSL have the advantage that ordinary voice calls can share the same line with data calls. The lower-frequency band of ADSL is used for voice calls, while the upper frequencies are used for data calls. FIG. 1 is a diagram of the partitioning of frequency bands for ADSL data and voice calls. Plain-old-telephone service (POTS) voice calls are transmitted over low-frequency POTS band 2, as they are for standard telephone lines. POTS band 2 operates from about 100 Hz to 4 kHz. Since this is the same frequency range as standard telephones, ordinary telephone equipment can be used over POTS band 2.

Reverse channel 4 is for uploads from the customer, or for sending commands and user input from the customer to the central office and eventually to the Internet. Some embodiments may use a bi-directional channel in place of reverse channel 4. Reverse channel 4 operates at about 85 to 95 kHz, or up to 1 Mbps.

Wide-band 5 carries the bulk of the ADSL-line bandwidth. Wide-band 5 carries ADSL data to the customer at up to 8 Mbps. Wide-band 5 is a frequency band from 100 to 500 MHz. Thus ADSL is asymmetric; using a wide frequency band for downloads while using a relatively narrow frequency band for uploads. The lowest frequencies are reserved for POTS.

VOICE CALLS ON ADSL LINES WHEN POWER FAILS

Although voice calls can be made over ISDN, special terminal adapters must always be powered. When power fails, ISDN voice calls cannot be made. Thus, customers are told to have a standard POTS line for emergencies, in addition to the ISDN line.

ADSL voice calls can be made even when the power fails. External power is not required for the frequency-splitter circuit that separates the low-frequency voice band from the high-frequency data band. The splitter can be made of entirely passive components that do not require external power, and the power provided by the central office over the phone line is sufficient to power the POTS telephone. Since central offices have back-up power generators to power ordinary POTS lines during emergencies and power failures, ADSL lines, like POTS lines, continue to carry voice calls during power failures. Thus, a single ADSL line can serve as an emergency voice line. A second POTS line is not required as is true for ISDN.

ADSL EQUIPMENT INCLUDES FREQUENCY SPLITTER

Like ISDN, ADSL requires some line conditioning of the copper phone lines. Special equipment is needed at both the customer premises and at the phone company's central office where the customer's copper phone line ends. FIG. 2 is a diagram of a prior-art ADSL phone line highlighting the frequency splitters.

Copper phone line 20 is a pair of copper lines running from central office 8 to the customer. The phone customer has installed customer premises equipment 6. Since ADSL uses high frequencies for data traffic and low frequencies for voice calls, the signal received over copper phone line 20 must be split into high- and low frequency components. Splitter 12 contains a low-pass filter that outputs the low-frequency components from copper phone line 20. These low-frequency components carry the voice calls that are sent to telephone set 10. Telephone set 10 is a standard POTS analog telephone set. Additional phone sets, fax machines, or analog modem equipment can be connected to telephone set 10 as phone-line extensions as is well-known.

Splitter 12 also contains a high-pass filter that outputs the high-frequency components to ADSL modem 14. ADSL modem 14 converts the high-frequency analog signal from splitter 12 into digital data. Computer equipment can read this digital data and transmit digital data to ADSL modem 14 for conversion to analog-voltage modulations. Splitter 12 also mixes high-frequency data from ADSL modem 14 with the low-frequency voice from telephone set 10 and transmits the combined signal over copper phone line 20 to central office 8.

Copper phone line 20 is typically only one or two miles in length. Lines longer than 18,000 feet have too many loses for use as ADSL lines. Central office 8 receives copper phone line 20 and splits off the high-frequency components with splitter 16. The high-frequency components from splitter 16 are sent to ADSL modem 18, which converts the analog-voltage high-frequency signal to a digital data steam. The data stream can then be combined with a high-speed data highway or backbone.

Splitter 16 sends low-frequency components to conventional telephone switch 19, which is similar to other line cards that terminate POTS lines. Conventional telephone switch 19 connects to other switch circuits to be combined with other calls and sent to a pulse-code-modulated (PCM) highway for transmission to other central offices or to the long-distance networks.

Incoming voice calls received by conventional telephone switch 19 are combined by splitter 16 with modulated data traffic from ADSL modem 18. The combined signal is transmitted over copper phone line 20 to customer premises equipment 6.

ANALOG SPLITTER IS BULKY, COSTLY

FIG. 3 is a diagram of an analog splitter for splitting the high-frequency data calls from the low-frequency voice calls. Low-pass filter 86 is a network of inductors 92 in series and capacitors 94 in parallel. Since the series-inductor, parallel-capacitor network passes low-frequency signals but resist high-frequency signals, the low-frequency components from incoming telephone line 20 are passed through low-pass filter 86 to the telephone line card and eventually the telephone switch for POTS voice calls.

High-pass filter 88 is a network of capacitors 98 in series and inductors 96 in parallel. Series-capacitor, parallel-inductor networks pass high-frequency signals but block low-frequency components. Thus high-pass filter 88 passes the high-frequency components from incoming telephone line 20 while blocking the low-frequency POTS components. The high-frequency components are passed on to a data highway through an XDSL modem.

While such analog splitters are useful, they are relatively large and bulky. Inductor coils in particular are much larger than semiconductor components. The bulky coils are an impediment to miniaturization and cost reduction of ADSL. Since ADSL requires splitting the high- and low-frequency data and voice components, such bulky splitters have been considered a necessary part of ADSL. Inductors and other passive components are not easily integrated into semiconductor integrated circuits, as they cannot be mimicked by transistors.

MULTIPLE A/D CONVERTERS USED AT CENTRAL OFFICE—FIG. 4

FIG. 4 is a diagram of prior-art ADSL line equipment at a central office. Copper phone line 20 is received at the central office by analog splitter 22. Analog splitter 22 uses bulky inductor coils together with resistors and capacitors to form high-pass and low-pass filters. The output of the high-pass filter in analog splitter 22 is the high-frequency data components, which are sent to analog-digital A/D converter 24. A/D converter 24 converts the analog voltages from analog splitter 22 to digital values at a high sampling rate. These digital values are sent to ADSL processor 26, which extracts the encoded data values transmitted from the ADSL modem at the customer premises.

The data from ADSL processor 26 is combined with other such data, for transmission over a shared high speed data pathway 30. The high speed Data Network can be a fiber-optic backbone or other high-bandwidth network. ADSL processor 26 also receives data from high-speed data pathway 30 and encodes the data. The encoded data is then converted to analog voltages by A/D converter 24, and the resulting analog-voltage waveform is sent to analog splitter 22 where it is combined with the low-frequency voice signal and transmitted to the customer's premises over phone line 20. The low-frequency components output from the low-pass filter in analog splitter 22 are sent to conventional telephone line card 28, which is a standard line card used to terminate POTS phone lines. The analog signals from conventional telephone line card 28 are converted to digital values and encoded as PCM signals by A/D CODEC 32. The PCM signals from A/D CODEC 32 are combined with signals from other line cards (not shown) and transmitted over PCM highway 34 to other central offices, or to a long-distance network.

Incoming voice calls from PCM highway 34 are decoded and converted to analogvoltage waveforms by A/D CODEC 32. The analog-voltage waveforms are driven by conventional telephone line card 28 and then mixed with the high-speed ADSL data by analog splitter 22 and transmitted out on copper phone line 20.

The prior-art ADSL equipment at the central office is undesirable for several reasons. Splitter 22 is a bulky, expensive component using large inductor coils, capacitors, and resistors. Since splitter 22 is made of discrete components, it does not benefit from the continuing size and cost reductions of semiconductor integrated circuits.

SEGREGATED ARCHITECTURE, MULTIPLE EQUIPMENT RACKS

The prior-art ADSL architecture treats the ADSL and voice data as two completely separate data streams, each with its own encoders, decoders, and analog-digital converters. Such redundancy is wasteful. For example, FIG. 4 showed two separate points of analog-digital conversion, one for ADSL data at A/D converter 24, and another for conventional voice telephone calls at A/D CODEC 32.

Since two completely separate data streams are used, the ADSL and voice circuitry are typically segregated to different circuit boards or even separate equipment racks at the central office. For example, one rack may contain the conventional telephone line cards, while another rack contains the analog splitters and the ADSL modems. Often the racks are several feet apart. When many ADSL lines are terminated in a central office, the result can be a messy nest of wires connecting the ADSL and conventional telephone racks.

Terminating the phone line in such a central office is complicated by the multiple destinations of the signals. Instead of a single termination point on a single line card as for POTS, at least two termination points exist. The ADSL and POTS termination points can be physically several feet apart, complicating line provisioning.

What is desired is improved ADSL equipment at the central office. It is desired to eliminate the bulky analog splitter with its inductor coils and discrete components. It is further desired to reduce redundancy at the central office. It is desired to use a single A/D converter and to combine the encoding and decoding of POTS voice and ADSL data signals. It is desired to reduce wiring between racks at the central office by using a single line card for both ADSL and POTS signals from an ADSL line. It is desired to have a single termination point for the copper-pair ADSL phone line.

SUMMARY OF THE INVENTION

An integrated line card terminates a phone line at a central office. The phone line is connected to a customer premises. A phone-line input receives an analog phone signal from the phone line. The analog phone signal has a high-frequency band that carries data transmissions and a low-frequency band transmitting voice calls from a customer telephone set at the customer premises.

An analog phone-line interface is coupled to the analog phone signal. It powers the phone line and generates ring tones over the phone line to ring the customer telephone set when an incoming call to the customer premises is received at the central office. An analog-digital (A/D) converter is coupled to receive the analog phone signal. It converts the analog phone signal to a digital phone signal.

A digital splitter is coupled to receive the digital phone signal from the A/D converter. It separates the high-frequency band carrying the data transmissions from the low-frequency band transmitting the voice calls. The digital splitter outputs a high-frequency digital signal and a low-frequency digital signal.

A data-pathway interface receives the high-frequency digital signal from the digital splitter. It transmits the data transmissions from the customer premises to a data pathway. A voice-call highway interface receives the low-frequency digital signal from the digital splitter. It transmits the voice call received from the customer premises to a voice-call highway to other central offices. Thus the phone line is digitally split into high- and low-frequency signals to the data pathway and to the voice-call highway.

In further aspects of the invention the A/D converter converts both voice calls and data transmissions from the analog phone signal. Thus only one A/D converter and not two A/D converters are used to terminate the phone line at the central office.

In still further aspects the phone line is not connected to any other line cards at the central office. The integrated line card is a single termination point for the phone line at the central office. Thus the phone line carrying both the data and the voice calls is terminated at a single point by the integrated line card.

In further aspects of the invention the data is transmitted to the customer premises at a substantially higher rate than data is received from the customer premises. Thus data transmission is asymmetric, with a higher transfer rate to the customer premises than from the customer premises. The phone line is an asymmetric digital-subscriber line (ADSL) phone line.

In further aspects the invention includes a digital mixer that combines incoming digital voice calls from the voice-call highway with incoming data from the data pathway. The digital mixer outputs a composite digital signal to the A/D converter. The A/D converter converts the composite digital signal to an analog output for transmission as the analog phone signal. Thus data and voice calls are digitally mixed before conversion to the analog phone signal. In still further aspects the digital splitter and the digital mixer are a programmable digital-signal processor (DSP) programmed as a digital filter, sample-rate converter, and decoder/encoder. The data pathway is connected to send the data transmissions to the Internet.

In other aspects the customer telephone set at the customer premises is at least partially powered by the phone line and not by external power at the customer premises. Thus power from the central office over the phone line powers the customer telephone set when power fails at the customer premises, providing a life-line telephone service.

DETAILED DESCRIPTION

The present invention relates to an improvement in high-speed telephony. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that ADSL systems, as presently implemented, contain unwanted redundancy because ADSL and POTS are separated immediately and then processed as separate data streams. Wiring at the central office is complicated as the ADSL line is effectively terminated at two points. The inventors also realize that analog splitters using inductor coils are an impediment to size and cost reduction of ADSL. Such analog splitters using discrete passive components do not enjoy the rapid miniaturization and cost reduction of semiconductor integrated circuits.

TREAT ADSL AS A SINGLE DATA STREAM

The solution to the problems lies in treating the ADSL line as a single data stream for as long as possible. Instead of performing A/D conversion, termination, and coding/decoding on two separate data streams, these tasks can be performed on a single data stream. Even tasks that are handled in a different manner for POTS and ADSL, such as decoding and encoding, can be performed on the same hardware.

SINGLE TERMINATION POINT

Figure 1:
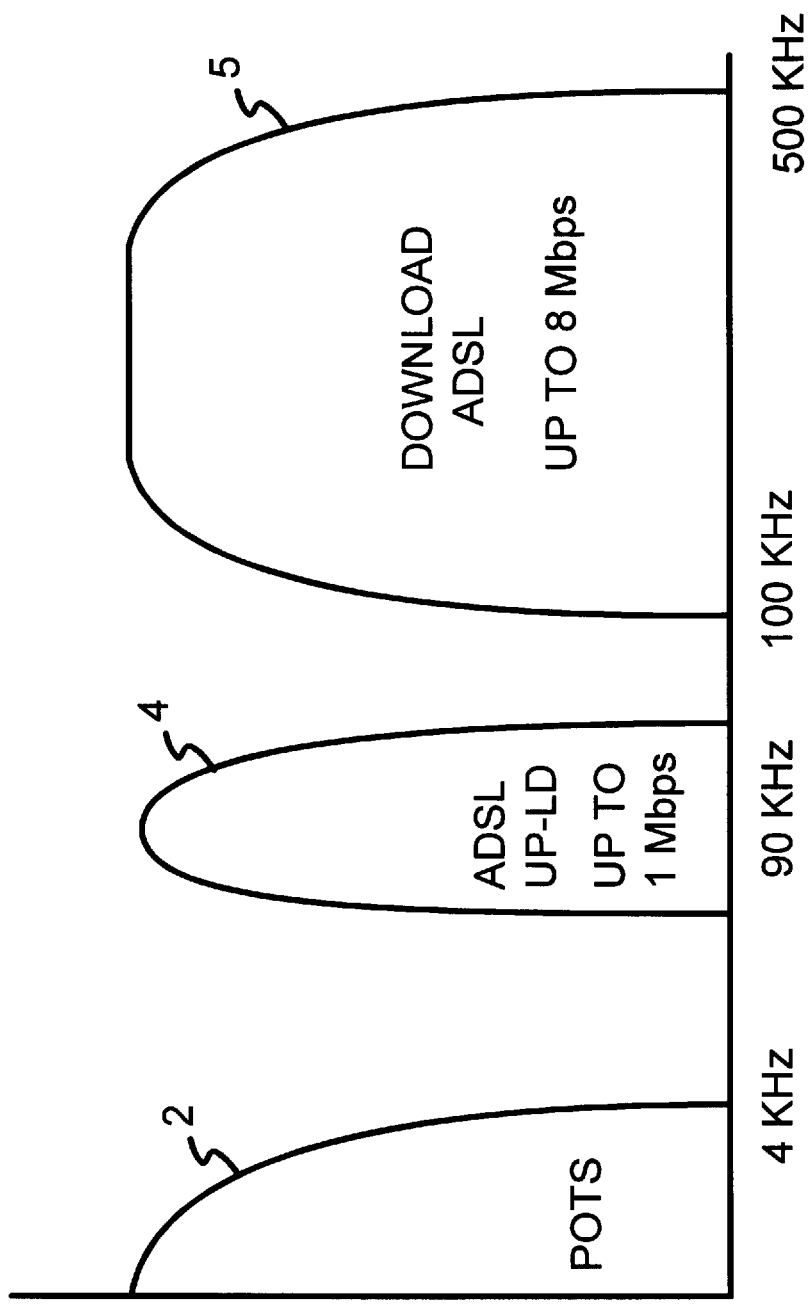
FIG. 1 is a diagram of the partitioning of frequency bands for ADSL data and voice calls.
Figure 2:
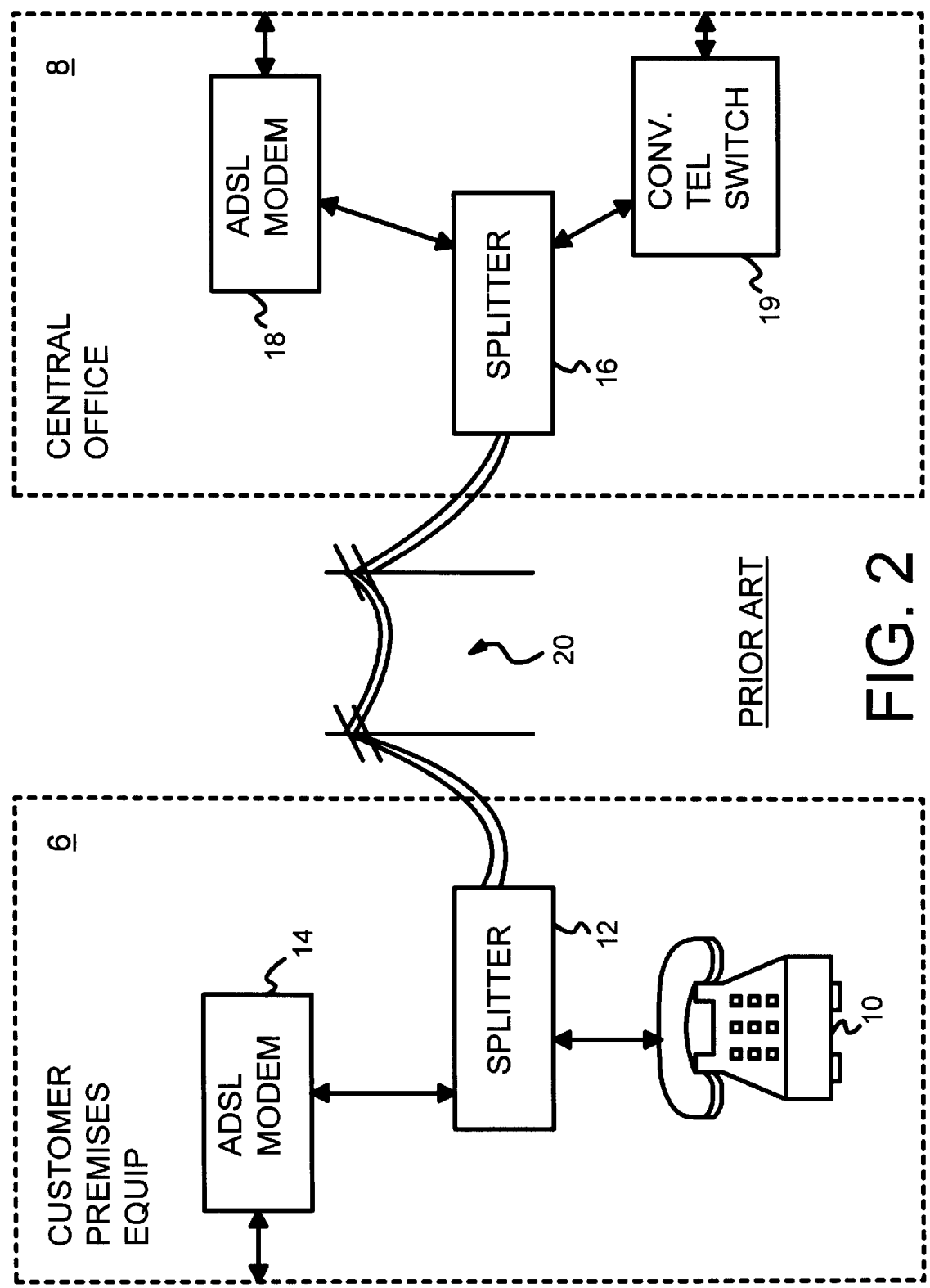
FIG. 2 is a diagram of a prior-art ADSL phone line highlighting the frequency splitters.
Figure 3:
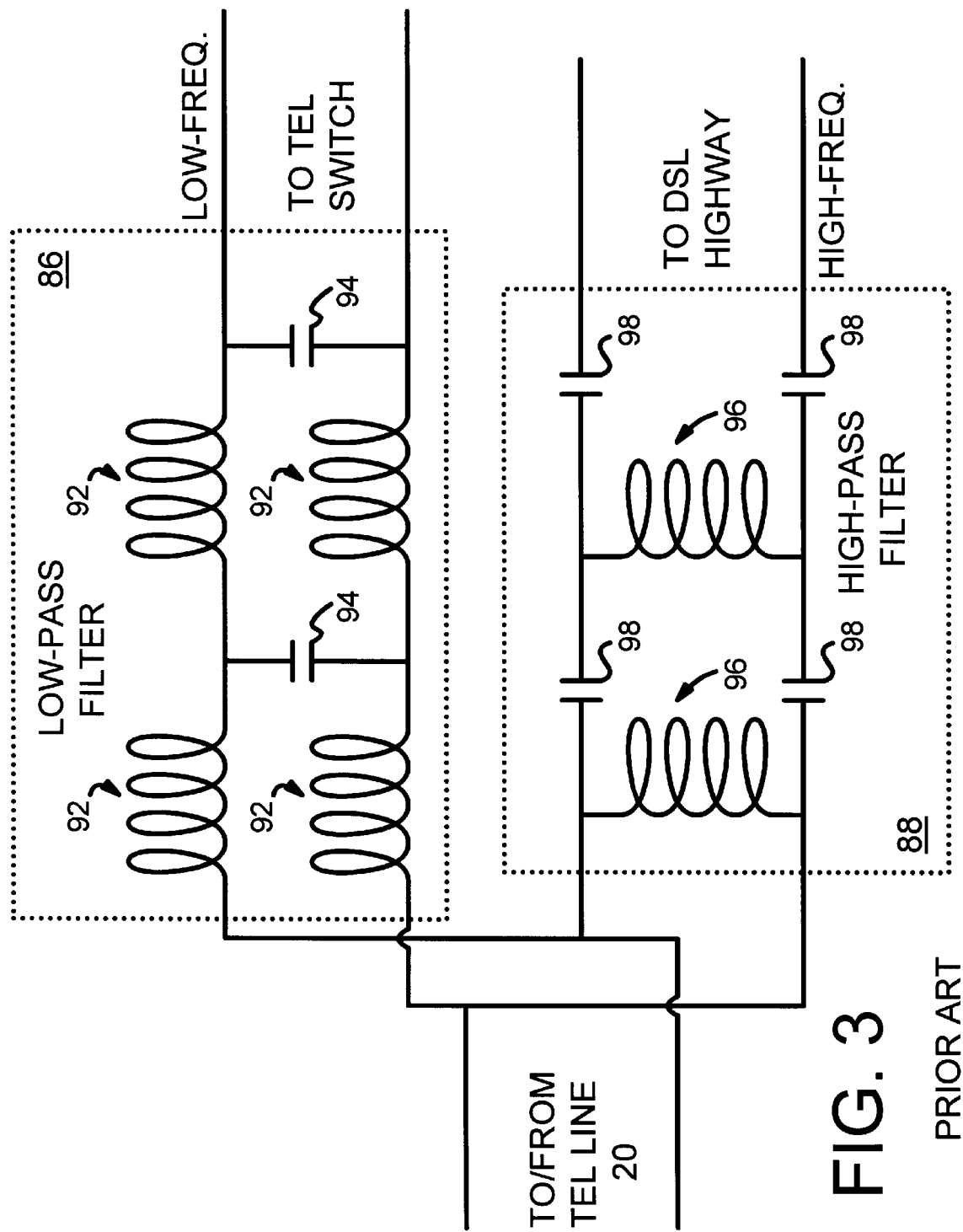
FIG. 3 is a diagram of an analog splitter for splitting the high-frequency data calls from the low-frequency voice calls.
Figure 4:
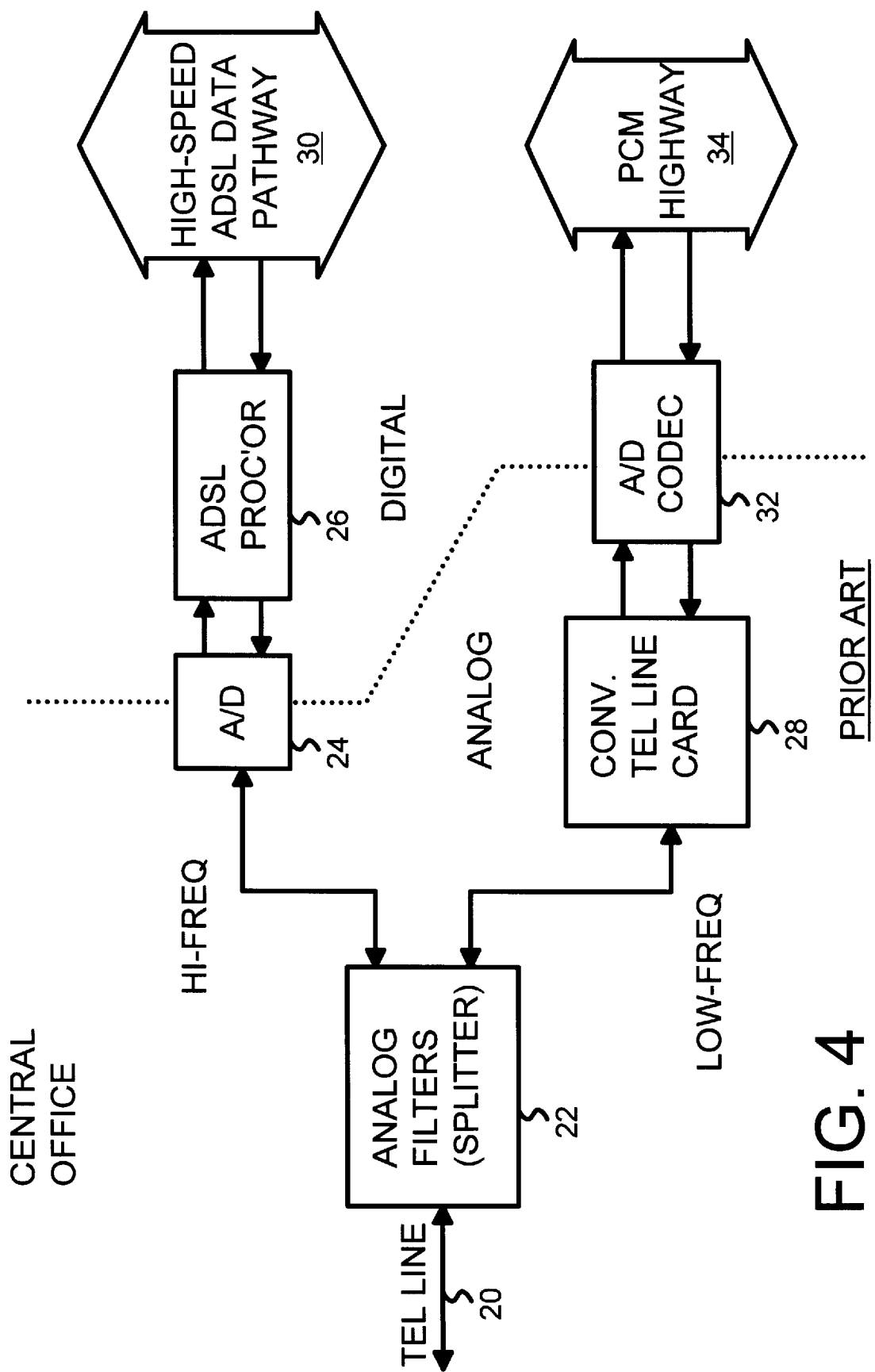
FIG. 4 is a diagram of prior-art ADSL line equipment at a central office.
Figure 5:
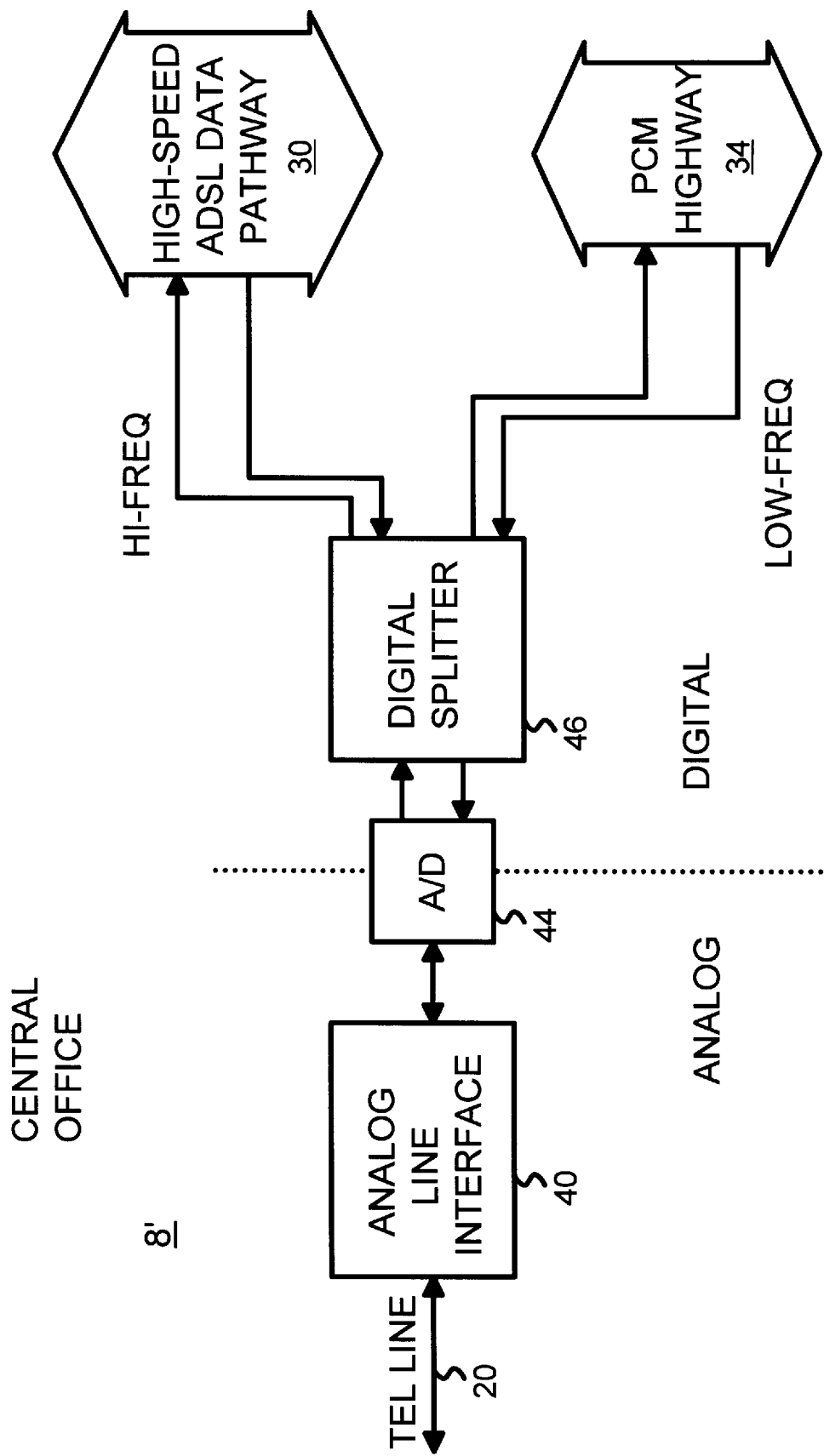
FIG. 5 shows an ADSL line with a single termination point at a central office.

FIG. 5 shows an ADSL line with a single termination point at a central office. Copper phone line 20 from the customer's premises is terminated at a single point at central office 8' by analog line interface 40. Analog line functions such as direct-current (D.C.) feed, off-hook detection and ring generation are provided by analog line interface 40. The analog telephone-line signal is passed through analog line interface 40 to A/D converter 44. Only one analog-digital converter is used rather than two A/D converters as in the prior art of FIG. 4. Since only one A/D converter is used rather than two, the ADSL phone line has only one point of termination rather than two termination points.

A/D converter 44 must operate at a high sample rate since the high-frequency ADSL data is still merged with the POTS signal. Since the analog input to A/D converter 44 contains both the high- and low-frequency components, the digitized output converted by A/D converter 44 contains both ADSL and POTS information. Digital splitter 46 reads the digitized output from A/D converter 44 and performs digital filtering to extract the high-frequency components from the low frequency components. The high-frequency components from digital splitter 46 are decoded and formatted for transmission to other central offices or to the Internet backbone over high-speed ADSL data pathway 30.

The low-frequency components from digital splitter 46 are decoded and then re-coded for transmission over PCM highway 34, which is a part of the existing telephone network. Incoming calls are re-formatted as low-frequency digital values and mixed with high-frequency ADSL data by digital splitter 46. Mixing can be performed by adding or combining digital values of the low and high-frequency inputs, after the low speed data is sample rate converted to match the high speed data.

Using a digital splitter rather than an analog splitter allows the analog phone line to be terminated at a single point rather than at to points. A single A/D converter is needed rather than redundant A/D converters. Redundancy is thus reduced.

INTEGRATED ADSL/POTS LINE CARD—FIG. 6

Figure 6:
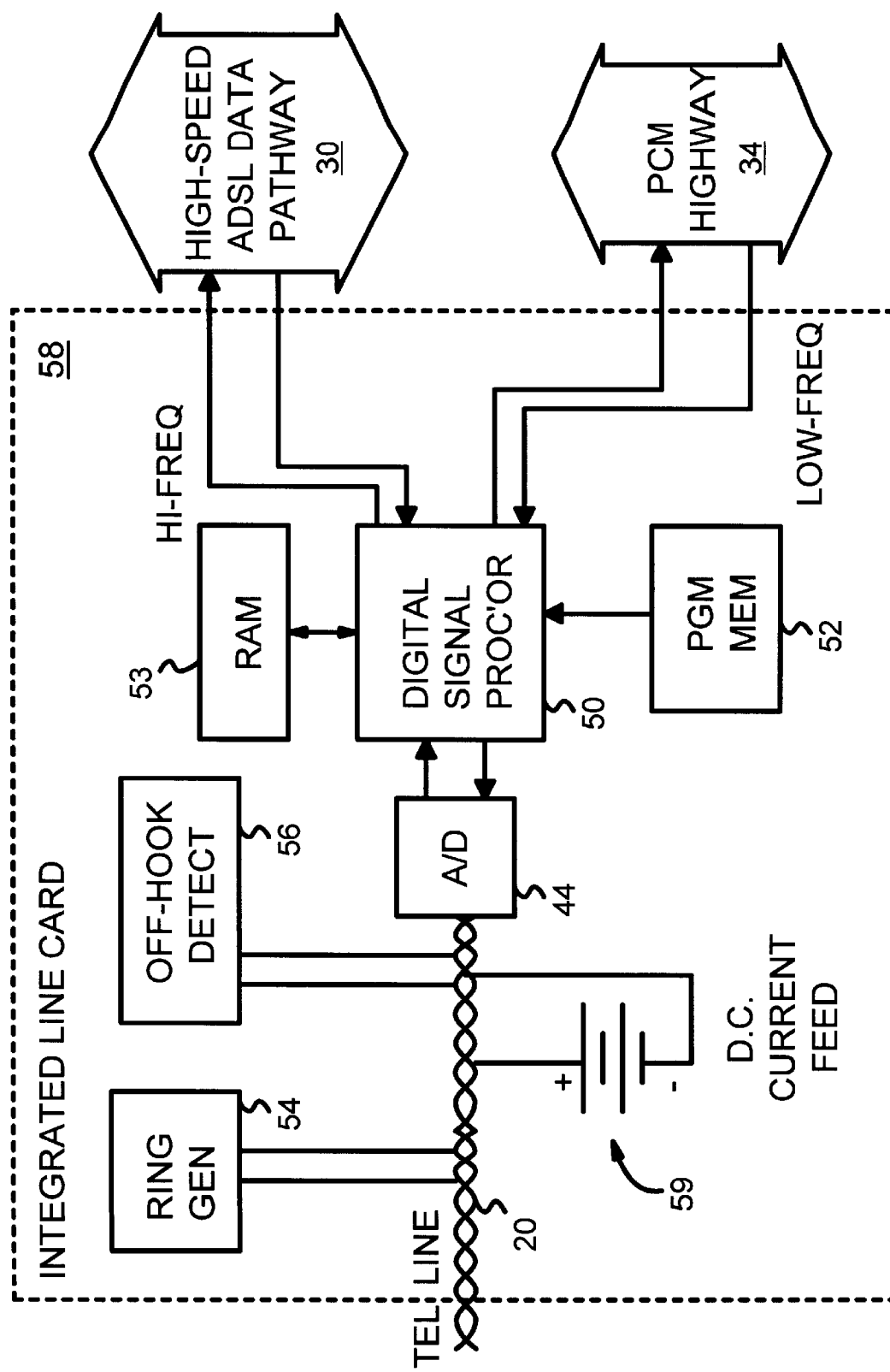
FIG. 6 is a diagram of an integrated ADSL and POTS line card for terminating an ADSL phone line at a central office.

FIG. 6 is a diagram of an integrated ADSL and POTS line card for terminating an ADSL phone line at a central office. ADSL phone line 20 is a standard copper twisted-pair cable from the customer. The customer has installed ADSL equipment at the customer's premises, including an analog splitter. Many different kinds of ADSL equipment can be installed at the customer's premises; the invention is designed to function properly with any standard ADSL customer equipment.

Rather than terminate the ADSL line at two different points in two different racks at the central office, ADSL phone line 20 ends at a single integrated line card 58. Line card 58 contains analog line-interface circuitry and digital processing to split off the high-frequency ADSL signal from the low-frequency POTS.

ADSL phone line 20 is the local loop, which is powered with a small direct-current (D.C.) by D.C. current feed 59. D.C. current feed 59 energizes phone line 20 and powers a remote splitter and POTS equipment at the customer's premises. Ring generator 54 is activated by an incoming call to the customer and generates a series of ringing pulses to phone line 20. These ringing pulses activate a ringer circuit on POTS telephone sets attached to phone line 20 at the customer premises. Off-hook detector 56 is also connected in series to phone line 20. Off-hook detector 56 detects when current is being drawn by the customer's POTS equipment when the phone handset is lifted off hook to initiate a call. A transformer (not shown) is often used to isolate the phone line from the line card and especially the A/D converter.

A/D converter 44 is also connected to the analog phone line 20. The ternmnation of phone line 20 includes all the circuitry connected to phone line 20 at the central office. D.C. current feed 59, ring generator 54, off-hook detector 56, and A/D converter 44 all are part of the termination of phone line 20. These analog circuits are located close to each other on one side of a single printed circuit board or card. Since all this circuitry is contained on single integrated line card 58, phone line 20 is terminated at a single point at the central office. The electrical properties of phone line 20 are improved since the circuit loads on phone line 20 are all located in close proximity to each other. This reduces reflections and other interference.

The analog part of integrated line card 58 ends at A/D converter 44. The remaining portions of line card 58 are in the digital domain. Operations on digitized waveforms are performed by programmable digital-signal processor (DSP) 50. DSP 50 receives a sequence of digital values from A/D converter 44. These digital values represent the amplitude of the analog voltages sampled by A/D converter 44 at fixed points in time known as the sample time-points. DSP 50 is able to re-construct a digital version of the analog-voltage waveform received over phone line 20 by A/D converter 44.

DSP 50 performs several operations on the digital waveform received. These operations are performed under program control by firmware routines stored in memory 52. Memory 52 can be a one-time-programmed read-only memory ROM, an updateable flash ROM, or a volatile memory initialized following power-on. The updateable flash ROM and volatile memory allow for code updates, fixes and enhancements.

DSP 50 in one embodiment is a standard programmable DSP, which can be programmed to perform digital filtering, anti-aliasing, data extraction, and data encoding, decoding, and formatting. For example, DSP 50 performs a high-pass filter on the digital values representing the analog-voltage waveforms converted by A/D converter 44. The output of the high-pass digital filtering routine is stored in RAM 53 as the ADSL data stream. The ADSL data stream stored in RAM 53 can be fetched by a data-extractor routine executing on DSP 50 to extract the ADSL data encoded into the waveforms transmitted by the customer. The ADSL data can be stored in RAM 53 and later fetched by an ADSL-formatting routine to compress and format the ADSL data for high-speed transmission over the Internet backbone. A transmitter routine can then fetch the formatted ADSL data and transmit it out one of the output ports of DSP 50 that is connected to high-speed ADSL data pathway 30.

DSP 50 also performs a low-pass filter on the digital values from A/D converter 44, which can be temporarily stored in RAM 53. The output from the low-pass filter is stored in RAM 53 and later fetched by a voice de-modulator routine to extract the original sound modulations from the customer's POTS telephone set. Anti-aliasing may also be performed. The digitized representation of the original sound is converted to pulse-code-modulations before being transmitted out another output port of DSP 50 to PCM highway 34.

Integrated line card 58 contains drivers and receivers that interface input and output ports of DSP 50 with external connectors to PCM highway 34 and high-speed ADSL data pathway 30. A new ADSL line can be installed at the central office by installing another integrated line card into a rack, and plugging cables into the line card's connectors to I/O equipment for the PCM highway and ADSL data pathway. Phone line 20 is plugged into the analog side of integrated line card 58 to complete the installation.

DSP RECEIVER OPERATION—FIG. 7

Figure 7:
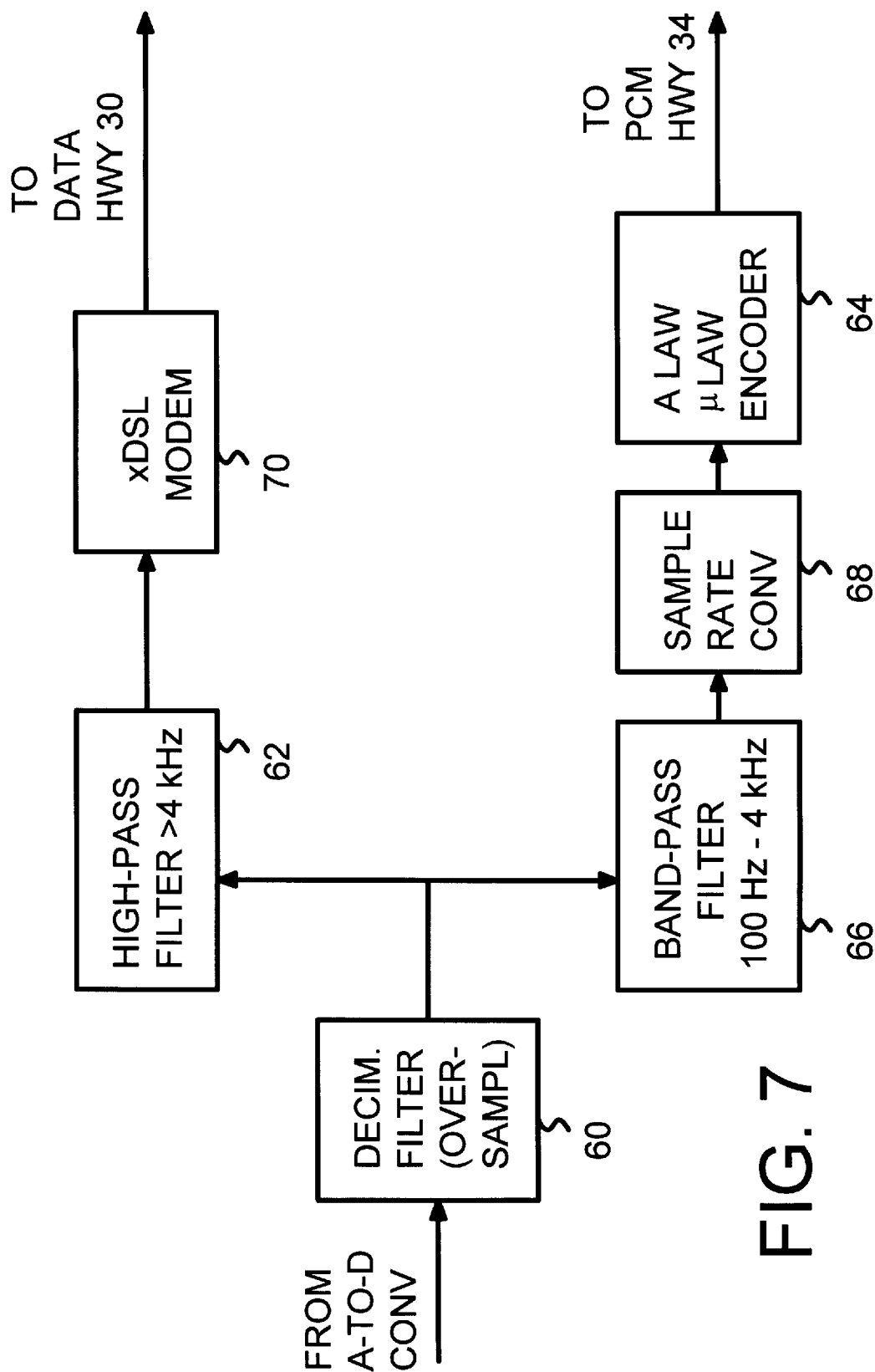
FIG. 7 is a diagram of digital-domain functions performed by the receive section of the integrated line card.

FIG. 7 is a diagram of digital-domain functions performed by the receive section of the integrated line card. Each of the functional blocks in FIG. 7 are preferably implemented as routines that are stored in memory 52 and executed on DSP 50 of FIG. 6.

The digital values of the analog voltages converted by the A/D converter are passed through decimation filter 60 to create accurate samples at the frequency desired for subsequent processing. Decimation filter 60 performs a decimation Finite Impulse Response FIR filter on the output from the AID converter. Decimation is similar to sample rate conversion used when the A/D converter over samples the data. The output from decimation filter 60 is temporarily stored in the RAM, and then sent to high-pass filter 62 and band-pass filter 66. Together, the digital filters 62, 66 perform the frequency-splitting function to split ADSL data from POTS.

High-pass filter 62 performs a high-pass FIR filter to extract frequency components that are greater than 4 kHz. High-pass filter 62 then passes these high-frequency components to xDSL modem 70, which performs additional signal processing to extract the ADSL data from the customer and format the data for transmission to the Internet over high-speed ADSL data pathway 30. This additional signal processing can include fast-fourier-transforms, Viterbi decoding, de-channelization, forward-error-correction, and cyclical-redundancy checking (CRC). Trellis encoding is a technique used to convert data bits to phase and amplitude constellation points such that data errors are reduced. Viterbi decoding is used to recover data that has been trellis encoded. The ADSL modem data may be multiplexed into separate logical channels, with different error-correction characteristics. Channelization is the process of merging the streams onto the ADSL data stream and de-channelization is the process of recovering them. The term "xDSL" refers to any DSL technology such as ADSL, IDSL, RADSL, HDSL, SDSL.

Band-pass filter 66 uses band-pass FIR filtering to extract voice-band data of 100 Hz to 4 kHz. The lower limit of band-pass filter is 100 Hz, so that noise and interference from 60 Hz sources is removed.

Sample-rate converter 68 changes the sampling rate from about 1 MHz down to 8 kHz. Voice calls can be limited to 8 kHz due to the limited hearing range humans have. The digital values from the A/D converter were sampled from the analog phone line at a much higher rate, about 1 MHz, to capture all the high-frequency data for ADSL. Sample-rate converter 68 reduces the number of digital values by a factor of 125 by averaging successive digital values.

Encoder 64 receives the sample-rate converted voice data from sample-rate converter 68. Encoder 64 converts the voice data to either A-Law or $\mu$-Law, two forms of 8 KHz 8-bit encoding used to carry voice in the Public Switched Telephone Network (PSTN). encoded pulse-code-modulated (PCM) signals, which are sent over PCM highway 34, the existing voice, telephone network that connects central offices to one other. A concentrator (not shown) may be used at the central office to combine many encoded voice calls together before transmission to another central office.

DSP TRANSMITTER OPERATION—FIG. 8

Figure 8:
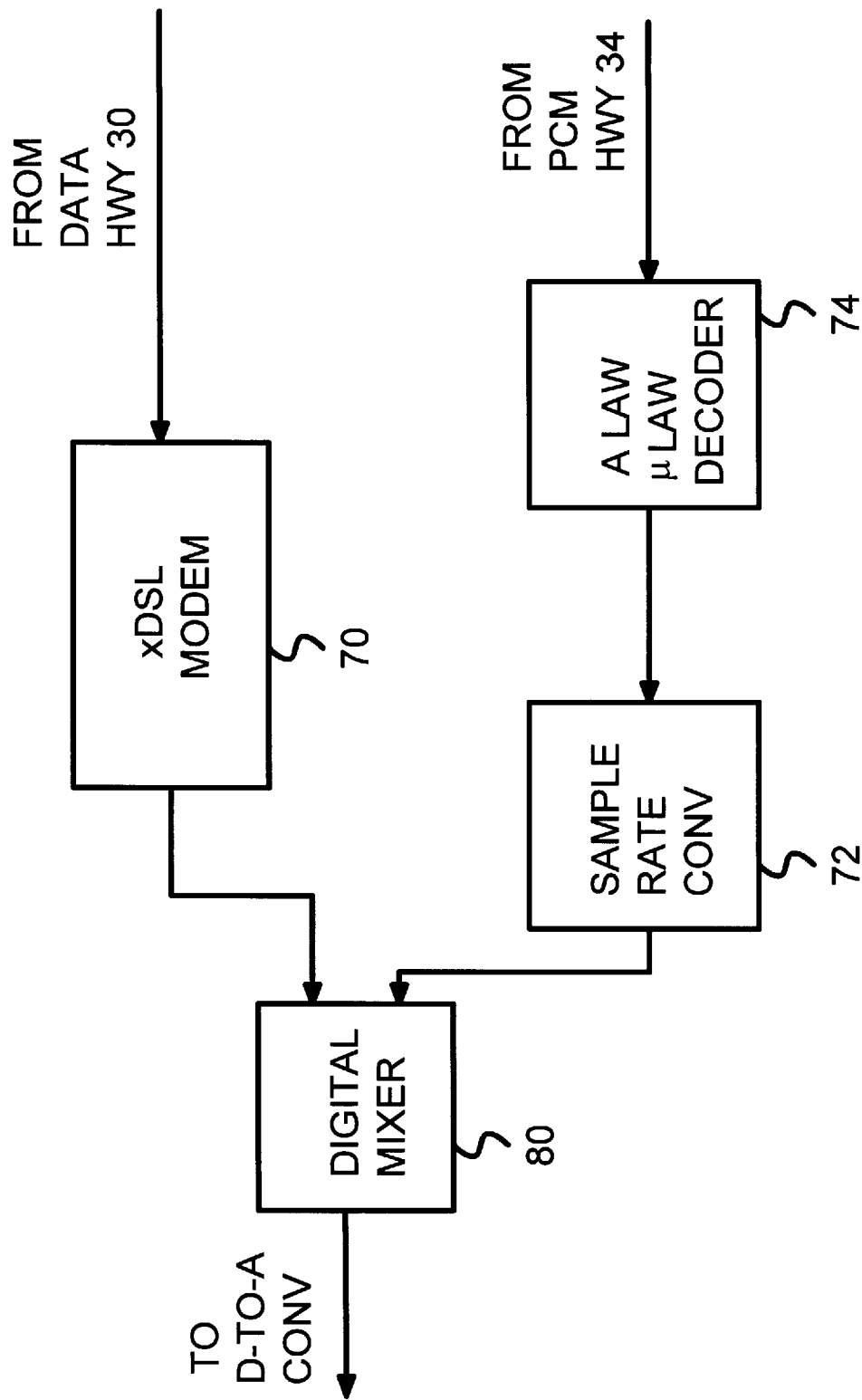
FIG. 8 is a diagram of digital-domain functions performed by the transmit section of the integrated line card.

FIG. 8 is a diagram of digital-domain functions performed by the transmit section of the integrated line card. Each of the functional blocks in FIG. 8 are preferably implemented as routines that are stored in program memory 52 and executed on DSP 50 of FIG. 6.

XDSL data from high-speed data pathway 30 is received by xDSL modem 70. The data received is re-formatted and modulated at the high frequency used by xDSL modem 70. CRC generation, forward-error-correction generation, trellis encoding, and inversefast-fourier transforms are performed by xDSL modem 70. The high-frequency modulated output from xDSL modem 70 is sent to digital mixer 80 to be combined with the incoming voice stream before conversion to analog voltages.

Incoming voice calls from PCM highway 34 are decoded by decoder 74. Either A-Law or $\mu$-Law encoding is normally used for transmitting voice calls over PCM highway 34. The decoded voice is then sample-rate converted by sample-rate converter 72. The decoded voice is adjusted from 8 kHz to the 1 MHz sample rate of the ADSL data stream.

The converted data stream from sample-rate converter 72 is mixed with the data stream from xDSL modem 70. Both data streams are at a 1 MHz sample rate. The digital values for the POTS data stream can be superimposed or added to the digital values for the ADSL data stream by digital mixer 80. Digital mixer 80 outputs the composite data stream with both the high-frequency ADSL data and the low-frequency voice data to the A/D converter for transmission over the local phone line to the customer.

ADVANTAGES OF THE INVENTION

The invention only changes the equipment at the central office; no changes are required for the customer premises equipment. Thus, the invention can easily be phased in by telephone companies without any customer equipment changes. The invention is compatible with existing ADSL systems.

ADSL offers lifeline service when the customer's power has failed. The ADSL phone line is simply an extension of a normal POTS phone line with an increased frequency band for high-speed data transmission. Thus ADSL is more easily added to existing phone systems than other technologies without lifeline support such as HDSL.

The bulky, expensive analog splitters and their inductor coils are eliminated. Further improvements in semiconductor integrated circuit processing can result in further cost reduction of ADSL line cards using the invention. While the analog splitters at the central office are eliminated, the existing analog splitters in the customer premises equipment do not have to be replaced. Indeed, having an analog splitter at the customer's premises is advantageous since it can operate when power fails using the local-loop current.

Redundancy is reduced using digital splitting. The combined ADSL/POTS signal remains together through A/D conversion. Thus, only one A/D converter is needed, eliminating the second A/D converter of prior-art systems. Additional redundancy in decoding, encoding, and formatting hardware can be eliminated by using a single re-programmable DSP chip for these functions. The DSP is simply re-programmed to adjust for he different ADSL or POTS encoding schemes used.

Using a single integrated line card allows the phone line to be terminated at a single point in the central office, rather than at two points. Multiple termination points add reflections and other interferences to the phone line, degrading quality. Thus, the single termination point can improve line quality.

Separate racks at the central office are not required, as the phone line ends at a single line card. Wiring between racks is significantly reduced, simplifying central-office wiring.

ALTERNATE EMBODIMENTS

Several other embodiments are contemplated by the inventors. For example the programmable DSP, data RAM, and program memory of FIG. 6 could be replaced by dedicated circuits for performing each function. The RAM and/or program memory can be integrated into the DSP chip, and even the A/D converted can be integrated onto a one- or two-chip set. Processing of the ADSL and POTS data streams can occur in parallel, either by using two separate processors in the DSP, or with time-sharing of a fast DSP. A smoothing filter such as a capacitor can be added to the analog side of the A/D converter. A large analog driver with enough drive for the phone line is also normally added to the analog output of the AID converter.

The asymmetric nature of the ADSL line can be exploited by the line card. More time in a time-sharing DSP can be allocated to the ADSL data transmission than for ADSL data reception, since download bandwidth is much greater than upload bandwidth. The voice section can be allocated even less time, as the sample rates for voice calls is only 8 kHz.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An integrated line card for terminating a phone line at a central office, the phone line connected to a customer premises, the integrated line card comprising:

a phone-line input for receiving an analog phone signal from the phone line, the analog phone signal having a high-frequency band for carrying data transmissions and a low-frequency band for transmitting voice calls from a customer telephone set at the customer premises;

an analog phone-line interface, coupled to the analog phone signal, for powering the phone line and generating ring tones over the phone line to ring the customer telephone set when an incoming call to the customer premises is received at the central office;

an analog-digital (A/D) converter, coupled to receive the analog phone signal, for converting the analog phone signal to a digital phone signal;

a digital splitter, coupled to receive the digital phone signal from the A/D converter, for separating the high-frequency band carrying the data transmissions from the low-frequency band transmitting the voice calls, the digital splitter outputting a high-frequency digital signal and a low-frequency digital signal;

a data-pathway interface, receiving the high-frequency digital signal from the digital splitter, for transmitting the data transmissions from the customer premises to a data pathway; and a voice-call highway interface, receiving the low-frequency digital signal from the digital splitter, for transmitting the voice call received from the customer premises to a voice-call highway to other central offices, whereby the phone line is digitally split into high- and low-frequency signals to the data pathway and to the voice-call highway.

2. The integrated line card of claim 1 wherein the A/D converter converts both voice calls and data transmissions from the analog phone signal, whereby only one A/D converter and not two A/D converters are used to terminate the phone line at the central office.

3. The integrated line card of claim 2 wherein the phone line is not connected to any other line cards at the central office, and wherein the integrated line card is a single termination point for the phone line at the central office, whereby the phone line carrying both the data and the voice calls is terminated at a single point by the integrated line card.

4. The integrated line card of claim 2 wherein data is transmitted to the customer premises at a substantially higher rate than data is received from the customer premises, whereby data transmission is asymmetric, having a higher transfer rate to the customer premises than from the customer premises.

5. The integrated line card of claim 4 wherein data is transmitted to the customer premises at a first rate, the first rate being about ten times a rate data is received from the customer premises.

6. The integrated line card of claim 5 wherein the phone line is an asymmetric digital-subscriber line (ADSL) phone line.

7. The integrated line card of claim 5 wherein the low-frequency band is at frequencies of less than 4 kHz and the high-frequency band is at frequencies above 100 kHz.

8. The integrated line card of claim 7 wherein the phone line is an ADSL phone line containing a mid-frequency band at frequencies of about 90 kHz for sending data from the user to the central office, wherein the high-frequency band is for transmitting data from the central office to the customer premises.

9. The integrated line card of claim 2 further comprising a digital mixer for combining incoming digital voice calls from the voice-call highway with incoming data from the data pathway, the digital mixer outputting a composite digital signal to the A/D converter, the A/D converter including means for converting the composite digital signal to an analog output for transmission as the analog phone signal, whereby data and voice calls are digitally mixed before conversion to the analog phone signal.

10. The integrated line card of claim 9 wherein the digital splitter and the digital mixer comprise a programmable digital-signal processor (DSP) programmed as a digital filter, sample-rate converter, and decoder/encoder.

11. The integrated line card of claim 2 wherein the data pathway is connected to send the data transmissions to the Internet.

12. The integrated line card of claim 2 wherein the customer telephone set at the customer premises is at least partially powered by the phone line and not by external power at the customer premises, whereby power from the central office over the phone line powers the customer telephone set when power fails at the customer premises, providing a life-line telephone service.

13. An asymmetric digital-subscriber line (ADSL) line card for terminating an ADSL phone line at a central office, the ADSL line card comprising: an analog interface to a copper twisted-pair phone cable from a remote customer;

an analog-digital (A/D) converter, for converting analog voltages coupled from the copper twisted-pair phone cable to a composite digital signal representing the analog voltages, the A/D converter also converting incoming mixed digital signals to analog voltages for driving the copper twisted-pair phone cable;

a digital-signal processor (DSP), coupled to the A/D converter, for digitally filtering the composite digital signal to produce a high-frequency component and a low-frequency component, the high-frequency component being a representation of data transmissions over the copper twisted-pair phone cable while the lowfrequency component being a representation of a voice call from plain-old-telephone-service (POTS) equipment at the remote customer;

the DSP including data formatting means for formatting the high-frequency component to a data format for transmission over a high-speed data network to the Internet; and the DSP including voice-call encoding means for encoding the low-frequency component as pulse-code-modulated (PCM) data for transmission over a PCM highway for transferring voice calls to other central offices, whereby the DSP digitally splits the high- and low-frequency components representing the data transmissions and the voice calls, and wherein an analog splitter at the central office is not used.

14. The ADSL line card of claim 13 wherein the DSP is a programmable DSP chip that includes a memory for storing data and routines, the routines including programs to digitally filter signals and to format and encode data, wherein the data formatting means and the voice-call encoding means comprise programs executed by the DSP.

15. The ADSL line card of claim 13 wherein the DSP includes a receive section, the receive section comprising:

a high-pass filter for outputting the high-frequency components without the low-frequency components;

a DSL modem for re-formatting the high-frequency components from the high-pass filter to a data format for transmission over the high-speed data network;

a band-pass filter for outputting the low-frequency components without the highfrequency components;

a sample-rate converter, coupled to the band-pass filter, for reducing a sample rate of the low-frequency components from a high rate to a low rate;

A-law/μ-law encoder, coupled to the sample-rate converter and receiving the low-frequency components converted to the low rate, for encoding the low-frequency components using A-law or μ-law encoding for transmission over the PCM highway.

16. The ADSL line card of claim 15 wherein the receive section of the DSP further comprises:

an over-sampling filter, receiving the composite digital signal from the A/D converter, for removing sampling-rate-induced errors from the composite digital signal.

17. The ADSL line card of claim 15 wherein the DSP further includes a transmit section for transmitting incoming data and voice calls to the remote customer over the copper twisted-pair phone cable, the transmit section comprising:

a DSL modem, receiving data from the high-speed data network, for un-formatting data received from the high-speed data network, the DSL modem outputting digital data at the high rate;

A-law/μ-law decoder, coupled to receive incoming voice calls from the PCM highway, for decoding the incoming voice calls using A-law or μ-law decoding to generate a low-frequency decoded voice call;

a sample-rate converter, coupled to receive the low-frequency decoded voice call, for increasing a sample rate of the low-frequency decoded voice call to the high rate and outputting a high-rate voice call;

a digital mixer, receiving the high-rate voice call and the digital data at the high rate, for combining the high-rate voice call and the digital data at each sampling point of the high rate, the digital mixer outputting the incoming mixed digital signals to the A/D converter for conversion to analog voltages and transmission over the copper twisted-pair phone cable to the remote customer.

18. The ADSL line card of claim 17 wherein the voice calls from the DSP are combined with other voice calls at the central office before transmission over the PCM highway, whereby voice calls are combined.

19. A digital-subscriber line (DSL) for transmitting voice calls and data over a phone line, the digital-subscriber line comprising:

customer-premises equipment, located at a remote end of the phone line, the customer-premises equipment including:

an analog frequency splitter, coupled to the phone line, for splitting low-frequency voice calls from high-frequency data;

a DSL modem, coupled to receive the high-frequency data from the analog frequency splitter, for demodulating the data for use by computer equipment at a customer premises;

a telephone set, coupled to receive the low-frequency voice calls from the analog frequency splitter, for receiving and sending voice calls, the telephone set being an ordinary plain-old-telephone-service (POTS) telephone set;

central-office equipment, located at a local end of the phone line, for transmitting and receiving data and voice calls from the phone line, a central office connected to other central offices, long-distance exchanges, and Internet-connection points, the central-office equipment including:

an analog-line interface, connected to the phone line, for powering the phone line, generating ring tones and detecting when the telephone set is off hook at the customer premises;

an analog-digital converter, coupled to the phone line, for converting data and voice calls from the phone line to a combined digital data-stream;

a digital splitter, receiving the combined digital data-stream, for frequency-filtering the combined digital data-stream to output a POTS data-stream of low-frequency components of the combined digital data-stream and to output a DSL data-stream from the high-frequency components of the combined digital data-stream;

a first encoder for encoding the POTS data-stream for transmission to conventional telephone switch to send voice calls to other central offices; and a data transmitter for transmitting the DSL data-stream to the Internet-connection points, whereby the central-office equipment includes the digital splitter but the customer-premises equipment includes the analog frequency splitter.

20. The digital-subscriber line of claim 19 wherein the analog frequency splitter is powered by the phone line, the analog frequency splitter not requiring external power from the customer premises for passing the voice calls to the telephone set;

wherein the telephone set is powered by the phone line, the telephone set not requiring external power from the customer premises for sending and receiving the voice calls, whereby life-line telephone service is provided over the phone line.

21. The digital-subscriber line of claim 19 wherein the analog frequency splitter includes inductor coils, but the digital splitter includes no inductor coils, whereby the central-office equipment is less bulky, not using inductor coils for splitting.

22. The digital-subscriber line of claim 19 wherein the phone line is an asymmetric digital-subscriber line (ADSL) phone line.

* * * * *